(No Model.)
E. R. & L. WILLIAMS & E. B. HARVEY.
CULTIVATOR.
No. 590,694. Patented Sept. 28, 1897.
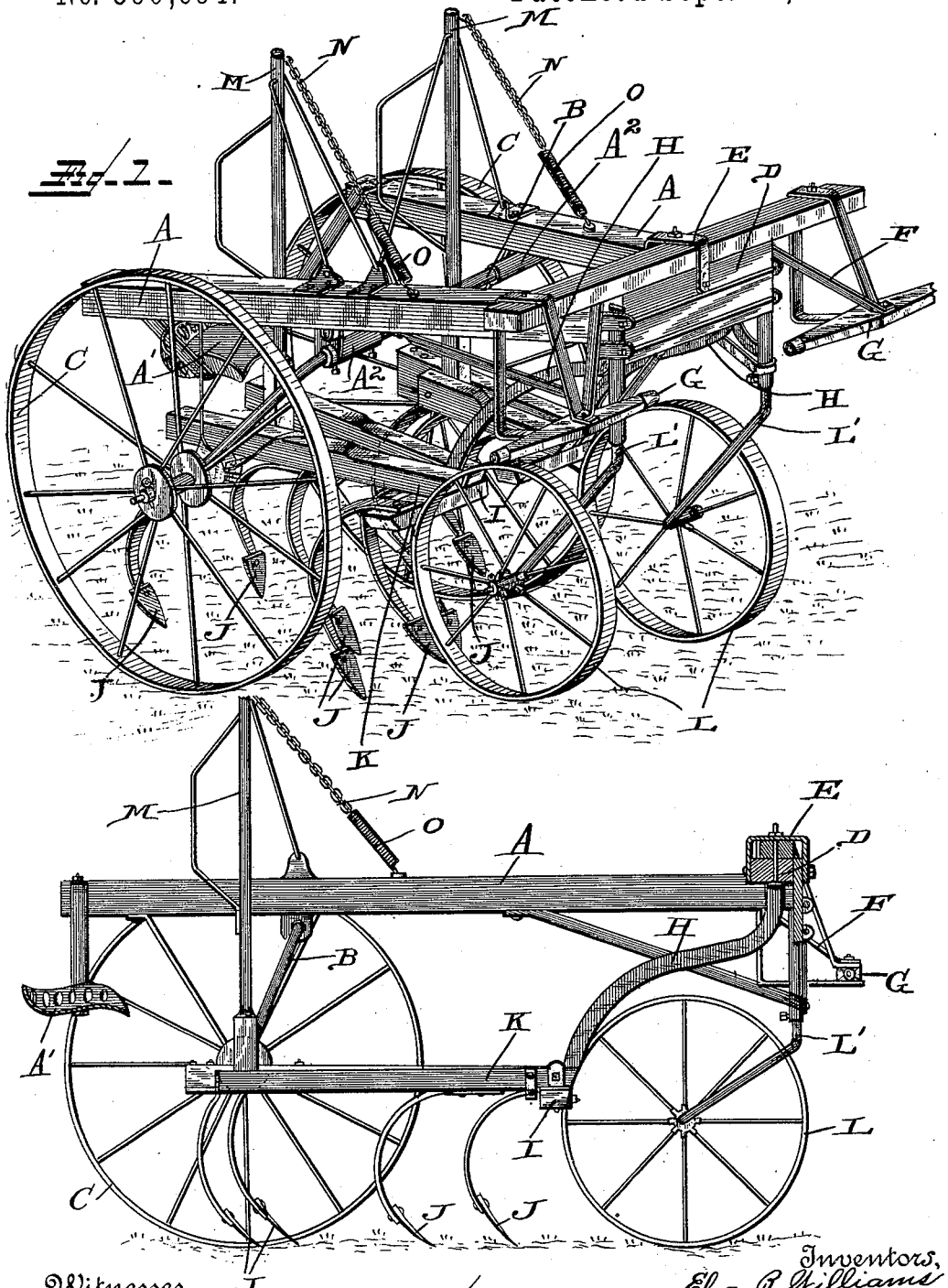

UNITED STATES PATENT OFFICE.

ELZA R. WILLIAMS, LEVI WILLIAMS, AND EDWIN B. HARVEY, OF ELWOOD, INDIANA.

CULTIVATOR.

SPECIFICATION forming part of Letters Patent No. 590,694, dated September 28, 1897.

Application filed February 29, 1896. Renewed June 19, 1897. Serial No. 641,489. (No model.)

*To all whom it may concern:*

Be it known that we, ELZA R. WILLIAMS, LEVI WILLIAMS, and EDWIN B. HARVEY, citizens of the United States, residing at Elwood, in the county of Madison and State of Indiana, have invented certain new and useful Improvements in Cultivators; and we do hereby declare the following to be a full, clear, and exact description of the invention, such as will enable others skilled in the art to which it appertains to make and use the same.

This invention relates to certain new and useful improvements in cultivators and riding-plows; and it has for its object, among others, to provide a simple, cheap, tongueless plow and cultivator by which the caster-trucks are arranged in front, where they are adapted for the better serving of their functions, and the arched beam which connects the frame also connects the draft, thereby allowing the front caster-trucks to revolve under the beam, which permits the beam to be turned within the space occupied by the plow and, when necessary, to turn at a right angle, which is a great desideratum in going near fences and around obstructions.

The other objects and advantages of the invention will hereinafter appear, and the novel features thereof will be fully pointed out in the appended claims.

The novelty in this instance resides in the peculiar combinations, in the construction, arrangement, and adaptation of its parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a perspective view of our improved cultivator. Fig. 2 is a longitudinal vertical section through the same.

Like letters of reference indicate like parts throughout the views.

Referring now to the details of the drawings by letter, A designates the parallel side bars, from the rear end of which is supported the seat A', while to the under side of said bars, near their center, are attached the boxes $A^2$, in which is mounted to revolve the crank-shaft B, which is substantially U-shaped and its cross portion supported in said boxes, while its ends are turned horizontally to form spindles upon which are mounted the wheels C, which may be of any suitable or well-known construction.

The front ends of the bars A are connected by the cross-bars D, and pivotally mounted thereupon upon a vertical pivot is a draft-bar E, to the end of which are attached the straps or chains F, to the forward ends of which are pivotally mounted the singletrees G, as shown.

H is an arched beam secured to the rear face of the cross-bar D and at its rear end connected with the transverse bars I, upon which is mounted the shovel or plow or other desired implement J, which is also secured to the longitudinal timbers K, attached to said transverse bars I. This arched beam permits of the ready turning of the caster-wheels L, which are mounted upon the supports L', which are mounted in suitable bearings at opposite sides at the front of the frame, as shown in the drawings. These caster-wheels serve for the guidance of the cultivator or plow.

M are levers connected with the plow-beams for raising and lowering the same to regulate the depth of the cut. They have connected to their upper ends chains N, the lower ends of which are connected with springs O, which are attached to the side bars A, as clearly shown in Fig. 1.

The machine thus constructed occupies but little space in the field or in the storage-room, and the draft being applied as above described the plow and wheels respond readily to the direction of the driver of the team.

Modifications in the details may be resorted to without departing from the spirit of the invention or sacrificing any of its advantages.

What is claimed as new is—

1. The combination with the side bars, the seat supported therefrom, and the crank-axle, and the wheels, of the arched beam at the front of the side bars, the pivoted draft appliance and the pivotally-mounted caster-wheels at the front of the side bars, and the plow-beams supported by the rear end of said arched beam, substantially as described.

2. The combination with the side bars, and the crank-axle and the wheels, of the arched beam at the front of the side bars, the pivoted draft appliance and the pivotally-mounted caster-wheels at the front of the side bars, and the plow-beams supported by the rear end of said arched beam, the said plow-beams being pivotally mounted and provided with means for adjusting the same, substantially as described.

3. The combination with the side bars, the plows, the crank-axle and its wheels, of the draft appliance pivotally mounted on the front connecting-bar of said side bars, the independently-mounted caster-wheels, and the arched beam to the rear of said caster-wheels whereby the latter may turn at a right angle to the side bars, substantially as described.

In testimony whereof we have signed this specification in the presence of two subscribing witnesses.

ELZA R. WILLIAMS.
LEVI WILLIAMS.
EDWIN B. HARVEY.

Witnesses:
G. W. ALFORD,
T. R. MADDOCK.